Dec. 11, 1951      L. C. LIBERATORE      2,578,563
AGE COMPENSATED GLASS THERMOMETER
Filed Feb. 26, 1949
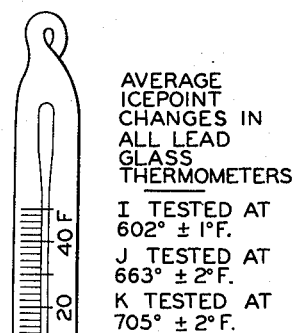
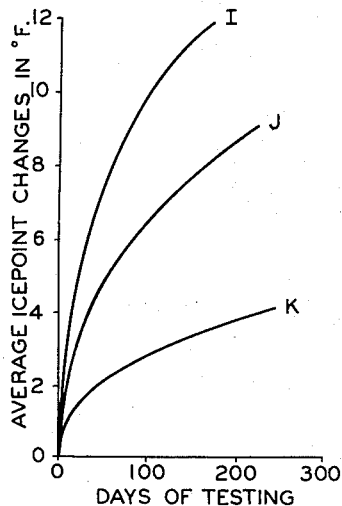
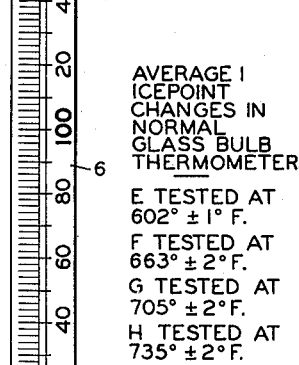
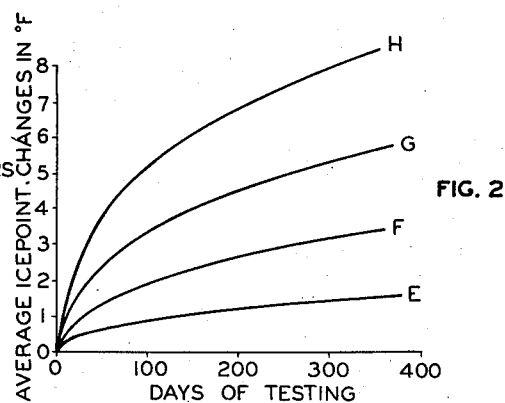
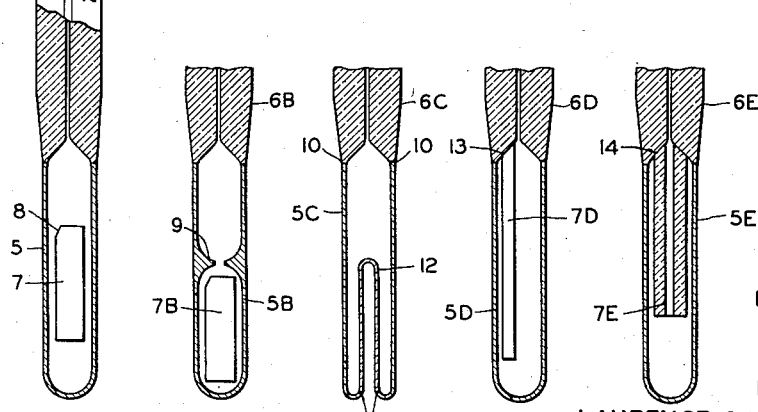
INVENTOR
LAURENCE C. LIBERATORE
BY D. Clyde Jones
ATTORNEY Patented Dec. 11, 1951

2,578,563

UNITED STATES PATENT OFFICE 2,578,563

AGE COMPENSATED GLASS THERMOMETER

Laurence C. Liberatore, Rochester, N. Y., assignor to Taylor Instrument Companies, Rochester, N. Y., a corporation of New York Application February 26, 1949, Serial No. 78,570

8 Claims. (Cl. 73—371)

This invention relates to a thermometer which is compensated for errors due to ageing of the glass of which it is made.

Glass thermometers, as now made, tend to become inaccurate as the glass thereof shrinks with ageing over the years.

The present invention has for its purpose a glass thermometer which is compensated for ageing so that it will retain its accuracy substantially unchanged throughout its life.

The various features and advantages of the invention will appear from the detailed description and claims when taken with the drawings in which:

Figs. 1A, 1B, 1C, 1D and 1E are fragmentary sectional views illustrating different embodiments of the invention; and Figs. 2 and 3 are charts useful in explaining the invention.

It has been disclosed in applicant's copending application Serial No. 770,150, filed August 22, 1947, now forfeited, that for every temperature, glass has a preferred molecular arrangement. If held at any particular temperature for a sufficient length of time, the glass will tend to approach this molecular arrangement. At temperatures in the annealing range this preferred molecular arrangement is attained rapidly in a matter of hours. At the annealing point this arrangement is attained in periods of less than an hour. As the temperature is lowered, the time required to reach the preferred molecular arrangement becomes longer and longer. Thus even for well annealed glass, the time required to reach the preferred molecular arrangement at 200–300° F. below its annealing range, is several years. Therefore, if a glass is given a stabilization treatment of practicable duration, as disclosed in the mentioned application, in order to reduce the changes resulting from this approach to the preferred molecular arrangement, the treatment cannot be completely effective unless it is applied over extremely long periods of time.

"Strain point," as the term is used herein, is that condition at which the glass has a viscosity of $10^{14.6}$ poises and "strain temperature" is that temperature at which a glass attains the strain point viscosity.

"Annealing point," as the term is used herein, is that condition at which the glass has a viscosity of $10^{13.4}$ poises and "annealing temperature" is that temperature at which a glass attains the annealing point viscosity.

"Annealing range," as the term is used herein, is the temperature range between the annealing point and the strain point.

In a thermometer, the approach to the preferred molecular arrangement results in a decrease in the volume of the bulb and the stem bore. This will cause the thermometer to become inaccurate and to read in excess of the true temperature value. The major part of this inaccuracy is due to bulb shrinkage since the volume of the bulb is so much larger than that of the capillary bore in the stem.

It has been discovered that if a number of thermometers made of the same glass are heated to a temperature in the annealing range and held at this temperature long enough to establish the preferred molecular arrangement and if these thermometers are then cooled according to a given schedule to a temperature well below the annealing range, they will all show the same small shrinkage which substantially follows Maxwellian distribution, when held at any particular temperature in the usable range of the glass. Also the shrinkage is a volume effect only and is, for the most part, independent of the shape or size of the volume of glass undergoing change, provided strain is removed from the glass. Thus if we have several thermometer bulbs which have undergone the same stabilization treatment, set forth in the mentioned patent application, and which are then held at the same temperature for the same period of time, the percentage volume change will be substantially the same, for all of these bulbs regardless of their size or shape. In addition, if a glass bulb and a solid piece of the same glass of a volume equal to the internal volume of the bulb, are both brought to a state of equilibrium at a given temperature, the percentage change in the two volumes will be substantially the same provided both are then subjected to the same temperature treatment, which treatment is confined to temperatures well below the annealing range. Otherwise expressed, if several pieces of a particular glass are brought to the same temperature, which is one at which the thermal histories of the pieces are completely erased and if these pieces are then cooled according to the same schedule without introducing strain therein, to a given temperature well below the annealing range, the volume effects in these pieces will be substantially the same, when they are subjected to similar subsequent treatment below the annealing range.

It has been discovered that if two glasses which have different annealing ranges, are subjected to a given treatment and then both held at the same temperature well below the annealing ranges of both glasses, the glass with the lower annealing range will undergo the greater volume shrinkage but the curves of each of the glasses showing the changes with time, will be quite similar in nature. The given treatment comprises the following steps:

(a) Each glass is heated to a given temperature in its annealing range.

(b) Each glass is held at the given temperature long enough to reach the equilibrium molecular arrangement for this given temperature.

(c) Each glass is then given its respective stabilization treatment. This stabilization treatment is such as to reduce the subsequent changes to as low values as possible for the particular glass in the practical time taken.

For example, thermometers with completely normal glass bulbs (Corning normal 8810) and lead glass (Corning lead 0041) stems were subjected to the above-mentioned treatment wherein the given temperature was 940° F. and the holding time was sufficient to remove the previous thermal histories of the bulbs. Thereafter the bulbs were given a stabilization treatment as above mentioned. These stabilized thermometers were held at various temperatures and showed bulb volume changes as indicated by the curves in the chart of Fig. 2. Thermometers with lead glass bulbs and lead glass stems were subjected to stabilization treatment wherein the hold at 840° F. was sufficient to remove the previous thermal histories of the bulbs. Thereafter the bulbs were given a stabilization treatment as above mentioned. These stabilized thermometer bulbs were held at various temperatures and showed the bulb volume changes as indicated by the curves in the chart of Fig. 3. The curves of Figs. 2 and 3 show that at any particular temperature of hold, the percent change in the volume of the bulb is always greater for the lead glass bulb than for the normal glass bulb. Over a substantial range the ratio of the percent change in volume of the lead glass bulb to that of the normal glass bulb is approximately constant. For example, over the range 602 to 705° F. the ratio is approximately 3. This ratio continued approximately constant for a period of eight months from which it appears that this condition will prevail indefinitely.

This indicates the possibility that drift in a glass thermometer bulb can be compensated for by inserting in the bulb a piece of glass with a lower annealing range than that of the bulb and then subjecting the ensemble to a stabilization treatment which accomplishes the following:

a. Completely removes the thermal history of both glasses.
b. Stabilizes the bulb glass which has the higher annealing range as much as possible in the practical time taken so that its changes in subsequent treatment are as low as possible.
c. Anneals the insert sufficiently to remove strain, but does not effectively stabilize it.

This procedure shows the following results:

a. If several thermometers are treated at the same time the percent volume changes in the bulbs are all similar and the percentage volume changes in the inserts are all similar.
b. The subsequent changes in the bulb glass are as small as practical.
c. The inserts will undergo much greater percentage volume changes than the bulbs.

If the percent volume changes in the inserts are determined for a particular heat treatment and those for the bulbs are also determined for the same heat treatment, the ratio of the volume of the bulb to the volume of the insert can be so chosen that the difference between the two volumes remains constant with time.

It will be understood that lead glass is not the only glass which can be used as the compensating glass. The prerequisites of the glass to be used for compensating inserts are:

(1) When subjected to the stabilization treatment of the bulb glass it should not soften to such an extent that it adheres firmly to the bulb glass. Unless the expension curves are exactly the same for the two glasses such adherence will result in strains which may cause fracture at a later time and which may give erratic drifts in many bulbs.

(2) Its annealing range should be such that its percentage volume changes during the subsequent exposure to temperature below the strain point are higher than those of the bulb glass, but bear an approximately constant ratio thereto.

(3) Its annealing range should be substantially above the range at which the thermometer is to be used.

Thus, if a thermometer with a normal glass bulb is to be used in the range 600–725° F., lead glass will serve as a suitable compensating glass. In lower ranges, lead glass will be satisfactory but a glass with an annealing range approximately 75–100° F. lower than lead glass would probably be more suitable. For borosilicate glass bulbs, normal glass inserts will be satisfactory where the completed thermometers are used in the region 825–875° F. Present experimental investigation has shown that this method will apply to any pair of glasses, for which the following is true:

(1) One glass has an annealing range preferably 100° F. or more lower than the other.
(2) The glass with the higher annealing range is used for the bulb glass.
(3) The glass with the lower annealing range is used as the insert.
(4) The ensemble can be put through a short heat treatment which will remove a large part of change in the bulb glass without causing the glass comprising the insert to deform too greatly or adhere to the glass comprising the bulb.
(5) The glass comprising the insert is annealed sufficiently by the heat treatment to remove strains such as would be visible in a polariscope.
(6) The subsequent use of the thermometer is in the temperature range where the curves of percent volume change versus time for both insert glass and bulb glass are similar in nature, and are below the temperature region where stabilization occurs in short periods of time.

Although, the invention can be utilized in various ways, the following embodiments will be sufficient to give a complete understanding of the invention. Referring first to Fig. 1A, there is illustrated a thermometer having a bulb 5 of normal glass communicating with a graduated capillary stem 6 which may be made either of lead glass or normal glass. The bulb and a part of a bore of the stem are filled with a thermosensitive liquid such as mercury (not shown). In order to compensate for the inaccuracies commonly known as drift resulting from the changing volume of the glass which normally occurs with use, there is introduced into the bulb of the thermometer a mass of glass 7, herein illustrated as lead glass, of appropriate volume so that as the bulb shrinks with the passing of time the piece of lead glass shrinks at a faster rate such that the net volume change of the bulb and the compensating lead glass will be approximately zero. Consequently the thermometer will be acceptably accurate throughout its life. It will be noted that the mass of lead glass has one of its ends cut away at 8 so that this mass will not act as a plug to prevent or retard the flow of mercury into or from the bore in the stem as the temperature changes.

In the form of the invention shown in Fig. 1B, the bulb 5B of the thermometer, is restricted at its intermediate portion 9 so that the mass 7B of compensating glass is always maintained in the lower portion of the bulb. As in the previous embodiment this bulb is made of normal glass and the capillary stem 6B joined thereto, may be made either of lead or normal glass. The compensating mass of glass 7B is also lead glass.

In the form of the invention shown in Fig. 1C the thermometer is also provided with a capillary stem 6C joined to the bulb 5C. In this embodiment the outer portion of the bulb between the points 10 and 11 are made of normal glass while the indented part 12 of the bulb which is fused to the outer portion of the bulb at 11, is lead glass.

In the embodiment of the invention shown in Fig. 1D there is provided a bulb 5D of normal glass joined to the stem 6D of graduated capillary tubing. In this instance the compensating mass 7D of lead glass is fused to a portion of the stem at 13.

In a further form of the invention shown in Fig. 1E, the thermometer comprises a normal glass bulb 5E joined to a graduated stem 6E of capillary tubing. In this instance the compensating mass of lead glass 7E is in the form of a tube, the opening through which communicates with the bore of the stem when the compensating glass is fused or otherwise joined to the stem at 14.

In all of these embodiments, there will be a different rate of shrinkage in the lead glass and the normal glass but the net volume of the bulb due to the different rate of shrinkage of the normal and lead glass will be maintained substantially uniform.

While in the described embodiments of the invention, normal glass and lead glass are disclosed for effecting the compensating relation, it will be understood that combinations of other types of glass can be used for effecting compensation for ageing as referred to earlier in the specification.

What I claim is:

1. In a glass thermometer comprising a glass capillary stem sealed at one end, a bulb communicating in sealed relation with the other end of said stem, said thermometer containing a thermoresponsive filling medium, and material modifying the volume of the bulb with the passage of time, said material shrinking in a manner similar to but at a faster rate than the shrinking of the bulb.

2. In a glass thermometer comprising a glass capillary stem sealed at one end, a bulb communicating in sealed relation with the other end of said stem, said thermometer containing a thermoresponsive filling medium, and material exposed to the filling medium in the bulb and modifying the volume of the bulb with the passage of time, said material shrinking in a manner similar to but at a faster rate than the shrinking of the bulb.

3. In a glass thermometer comprising a glass capillary stem sealed at one end, a bulb communicating in sealed relation with the other end of said stem, said thermometer containing a thermoresponsive filling medium, and material immersed in the filling medium in the bulb and modifying the volume of the bulb with the passage of time, said material shrinking in a manner similar to but at a faster rate than the shrinking of the bulb.

4. In a glass thermometer comprising a glass capillary stem sealed at one end, a bulb communicating in sealed relation with the other end of said stem, said thermometer containing a thermoresponsive filling medium, said bulb comprising one glass that shrinks with age at one rate and a second glass that shrinks with age at a different rate, the total shrinkage of the two glasses being such that the net volume change of the bulb with the passage of time is substantially zero.

5. In a glass thermometer comprising a glass capillary stem sealed at one end, a bulb communicating in sealed relation with the other end of said stem, said thermometer containing a thermoresponsive filling medium, said bulb being made mainly of one type of glass which has a given rate of volume change with age, and a mass of glass encircled by said bulb, said mass of glass having a given rate of volume change correlated to that of the bulb whereby the effective volume of the bulb continues substantially unchanged over long periods of time.

6. In a glass thermometer comprising a glass capillary stem sealed at one end, a bulb communicating in sealed relation with the other end of said stem, said thermometer containing a thermoresponsive filling medium, said bulb being made of normal glass, and a mass of lead glass within the bulb, the ratio of the volume space within the bulb to the volume of the mass with the passage of time being inversely proportional to rate of shrinkage with time of the normal glass with respect to the rate of shrinkage with time of lead glass whereby the effective volume of said bulb remains substantially unchanged.

7. In a glass thermometer comprising a glass capillary stem sealed at one end, a bulb communicating in sealed relation with the other end of said stem, said thermometer containing a thermoresponsive filling medium, said bulb being made of a first type of glass that shrinks with age at one rate, and a mass of glass fastened within the bulb adjacent said stem, the glass of said mass being of a second type that shrinks with age at a different rate from the first, the total shrinkage of the two glasses being such that the net volume change of the bulb with the passage of time is substantially zero.

8. In a glass thermometer comprising a glass capillary stem sealed at one end, a glass bulb communicating in sealed relation with the other end of said stem, said thermometer containing a thermoresponsive filling medium, said bulb having a reentrant portion, the glass of the reentrant portion of the bulb being of a type that shrinks faster with age than that of the remainder of the bulb to compensate for volume changes, in said bulb due to ageing of the glass thereof.

LAURENCE C. LIBERATORE.

REFERENCES CITED

The following references are of record in the file of this patent:

UNITED STATES PATENTS

| Number | Name | Date |
|---|---|---|
| 489,259 | Maxim et al. | Jan. 3, 1893 |
| 767,493 | Neubeck | Aug. 16, 1904 |
| 769,474 | Fruehauf | Sept. 6, 1904 |

FOREIGN PATENTS

| Number | Country | Date |
|---|---|---|
| 155,707 | Germany | Dec. 2, 1903 |
| 588,621 | France | May 12, 1925 |